United States Patent [19]

Evens

[11] 4,435,552
[45] Mar. 6, 1984

[54] PROCESS FOR THE PREPARATION OF COPOLYMERS OF ETHYLENE WITH AT LEAST ONE OTHER 1-ALKENE

[75] Inventor: Georges G. Evens, Maasmechelen, Belgium

[73] Assignee: Stamicarbon B.V., Geleen, Netherlands

[21] Appl. No.: 282,011

[22] Filed: Jul. 10, 1981

[30] Foreign Application Priority Data

Jul. 11, 1980 [NL] Netherlands .................. 8003997
Jun. 5, 1981 [NL] Netherlands .................. 8102724

[51] Int. Cl.³ .................. C08F 4/68; C08F 210/16; C08F 210/18
[52] U.S. Cl. .................. 526/140; 526/141; 526/143; 502/154
[58] Field of Search .................. 526/140, 141, 143

[56] References Cited

U.S. PATENT DOCUMENTS 3,629,212 12/1971 Benedikter et al. .................. 526/140
3,678,018  7/1972 Yasui et al. .................. 526/141
3,717,613  2/1973 Ichikawa et al. .................. 526/144
3,723,348  3/1973 Apotheker et al. .................. 526/141

FOREIGN PATENT DOCUMENTS 1403372  8/1975 United Kingdom .................. 526/144

OTHER PUBLICATIONS

Christman, Journal of Polymer Sciences, Pt. A-1, vol. 10, pp. 471–487 (1972).

*Primary Examiner*—Edward J. Smith

*Attorney, Agent, or Firm*—Cushman, Darby & Cushman

[57] ABSTRACT

Process for the preparation of copolymers consisting of 25–85% by wt. of ethylene, 15–75% by wt. of at least one other 1-alkene and optionally up to 20% by wt. of a polyunsaturated compound with application of a catalyst system containing a compound of a metal from sub-groups IV–VI of the periodic system and a compound of a metal from groups I–III of the periodic system, in which at least one hydrocarbon group is bound directly to the metal atom via a carbon atom, the polymerization being carried out in the presence of a halogen-containing compound of the general formula

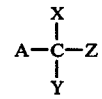

where A is a phenyl group which may contain one or two substituent halogen atoms or alkyl groups, or is a thienyl, furyl, pyrollyl, N-alkylpyrollyl or pyridyl group, which group is bound to the carbon atom directly or via a carbonyl group, X is a chlorine or bromine atom, Y is a chlorine, bromine or hydrogen atom or a hydrocarbon group with 1–8 carbon atoms, and Z is a nitrile group, a carboxyl group, an ester group, a hydrocarbyloxyalkylcarboxyl group, a carboxylic acid halide group, an amide group, a benzoyl group, a carboxyphenyl group or a carboxylhydrocarbylphenyl group.

15 Claims, No Drawings

PROCESS FOR THE PREPARATION OF COPOLYMERS OF ETHYLENE WITH AT LEAST ONE OTHER 1-ALKENE

The invention relates to a process for the preparation of copolymers consisting of 25-85% by wt. of ethylene, 15-75% by wt. of at least one other 1-alkene and optionally up to 20% by wt. of a polyunsaturated compound, with application of a catalyst system containing a compound of a metal from the sub-groups IV to VI of the periodic system and a compound of a metal from groups I to III of the periodic system, in which at least one hydrocarbon group is bound directly to the metal atom via a carbon atom.

Such processes have been known for quite some time and already find large-scale industrial application. It has been found that the most suitable catalyst systems contain vanadium compounds soluble in the polymerization medium, and alkyl aluminium halides. A disadvantage of these catalyst systems, however, is their relatively low activity, which implies that the catalyst costs per weight unit of polymer are rather high, while furthermore intensive purification of the polymer obtained is required to remove the catalyst residues.

For those reasons, attempts have been made for quite some time already to find possibilities to increase the polymerization yield, and it has been found that this can be achieved by addition of certain substances to the catalyst system. In Dutch patent application No. 6410447, for instance, it is proposed to use various halogenated compounds as promotor or activator, such as trichloroacetic acid or esters thereof, hexachloroacetone, hexachloropropylene or alpha-trichlorotoluene. It has been found very effective to use perchlorocrotonic acid compounds as activator, as described in Dutch patent application No. 6712044. However, these compounds have the disadvantage of possessing a high chlorine content. The conversion products of the perchlorocrotonic acid compounds partly remain behind in the polymer and cannot be removed from it to a sufficient degree through the usual steps for removal of catalyst residues, so that the polymers obtained with application of these compounds have a high chlorine content. The properties of the products, particularly the resistance to aging under the influence of climatic conditions, are adversely affected by a high chlorine content. In addition, a high chlorine content in the polymer appears to give rise to corrosion phenomena in the processing equipment. Consequently, there remained a need for a process for the preparation of copolymers of ethylene with at least one other 1-alkene and optionally a polyunsaturated compound by which a high polymer yield per weight unit of catalyst as well as a low halogen content of the product could be obtained.

A process has been found now for the preparation of copolymers consisting of 25-85% by wt. of ethylene, 15-75% by wt. of at least one other 1-alkene and optionally up to 20% by wt. of a polyunsaturated compound, with application of new activators for the catalyst system, by which high polymer yields per weight unit of catalyst are obtained. In many cases this process yields polymers with a low halogen content.

The process according to the invention for the preparation of copolymers consisting of 25-85% by wt. of ethylene, 15-75% by wt. of at least one other 1-alkene and optionally up to 20% by wt. of a polyunsaturated compound with application of a catalyst system containing a compound of a metal from the sub-groups IV to VI of the periodic system and a compound of a metal from groups I to III of the periodic system, with at least one hydrocarbon group bound directly to the metal via a carbon atom, is characterized in that the polymerization is effected in the presence of a halogen-containing compound of the general formula

where
A is a phenyl group which may contain one or two substituent halogen atoms or alkyl groups, or is a thienyl, furyl, pyrollyl, N-alkyl pyrollyl or pyridyl group, which group is bound to the carbon atom directly or via a carbonyl group,
X is a chlorine or bromine atom,
Y is a chlorine, bromine or hydrogen atom or a hydrocarbon group with 1-8 carbon atoms, and
Z is a group of any one of the following formulas 1-9, in which both R and R' are a hydrocarbon group with 1-8 carbon atom, and X is a chlorine or bromine atom:

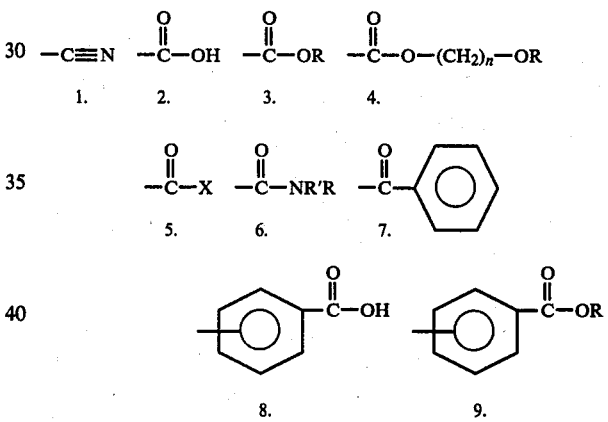

Preferably halogen-containing compounds are applied which contain one or two halogen atoms, in particular chlorine atoms, to each molecule. More in particular, preference is given to the alkyl and alkoxy alkyl esters of phenyl dichloroacetic acid, of diphenyl chloroacetic acid and of (2-thienyl)mono or dichloroacetic acid. However, compounds containing more halogen atoms may also be applied. Suitable halogen-containing compounds notably are: phenyl monochloroacetic acid, phenyl dichloroacetic acid, phenyl monobromoacetic acid, phenyl dibromoacetic acid, ethyl chlorophenyl acetate, ethyl dichlorophenyl acetate, propyl chlorophenyl acetate, propyl dichlorophenyl acetate, butyl chlorophenyl acetate, butyl dichlorophenyl acetate, ethyl bromophenyl acetate, ethyl dibromophenyl acetate, butyl bromophenyl acetate, butyl dibromophenyl acetate, methoxy ethyl chlorophenyl acetate, methoxy ethyl dichlorophenyl acetate, methoxy ethyl bromophenyl acetate, methoxy ethyl dibromophenyl acetate, ethyl 2-chloro-3-oxo-3-phenyl propionic acid, 2,2-dichloro-3-oxo-3-phenyl propionic acid, 2-bromo-3-oxo-3-phenyl propionic acid, 2,2-bibromo-3-oxo-phenyl propionic acid, ethyl 2-chloro-3-oxo-3-phenyl propionate, ethyl 2,2-dichloro-3-oxo-3-phenyl propionate, ethyl 2-bromo-3-oxo-3-phenyl propionate, butyl 2,2-dibromo-3-oxo-3-phenyl propionate, diphenyl chloroacetic acid, methyl chlorodiphenyl acetate, ethyl chlorodiphenyl acetate, bromodiphenyl acetic acid, ethyl bromodiphenyl acetate, butyl bromodiphenyl acetate. These compounds can be obtained by methods of preparation described in Bull. Sco. Chim. de France 1959, pp. 850 through 853, by M. Julia and M. Baillargé.

Suitable halogen-containing compounds which may be mentioned further are: monochlorophenyl acetonitrile, dichlorophenyl acetonitrile, monobromophenyl acetonitrile, dibromophenyl acetonitrile, dichlorobenzoyl acetonitrile, chlorophenyl acetyl chloride, dibromophenyl acetyl chloride, dichlorophenyl N,N,dimethyl acetamide, dibromophenyl N,N,diethyl acetamide, (carboethoxy phenyl)phenyl dichloromethane, (carbomethoxy phenyl)phenyl bromomethane, ethyl chloro(2-thienyl) acetate, ethyl dichloro(2-thienyl) acetate, butyl bromo(2-thienyl) acetate, butyl dichloro(2-thienyl) acetate, ethyl chloro(2-thienyl) acetonitrile, butyl bromo(2-thienyl) acetonitrile, ethyl dichloro(2-thienyl) acetonitrile, butyl dibromo(2-thienyl) acetonitrile, chloro(2-thienyl) acetyl chloride, ethyl chloro(3-pyrrollyl) acetate, butyl bromo(2-pyrrollyl) acetate, ethyl dichloro(2-pyrollyl) acetate, bromo(2-pyrollyl) acetonitrile, dichloro(2-pyrollyl) acetonitrile, chloro(2-pyrollyl) N,N-dimethyl acetamide, dibromo(2-pyrollyl) N,N-diethyl acetamide, ethyl chloro(3-pyridyl) acetate, butyl chloro(3-pyridyl) acetate, ethyl bromo(4-pyridyl) acetate, butyl bromo(2-pyridyl) acetate, ethyl chloro(2-furyl) acetate, butyl chloro(3-furyl) acetate, ethyl bromo(2-furyl) acetate.

The catalyst systems applied in the process according to the invention contain compounds of metals from groups I to III of the periodic system, with at least one hydrocarbon group bound directly to the metal atom via a carbon atom, and compounds of metals from the subgroups IV to VI.

Suitable compounds of metals from groups I to III of the periodic system with at least one hydrocarbon group bound directly to the metal atom via a carbon atom are, for instance, the compounds of sodium, lithium, zinc and magnesium and in particular aluminium. The hydrocarbon group bound to the metal atom in these compounds will preferably contain 1 to 30 carbon atoms, more in particular 1-10 carbon atoms.

Examples of suitable compounds are amyl sodium, butyl lithium, diethyl zinc, butyl magnesium chloride and dibutyl magnesium. Preference is given to aluminium compounds, notably trialkyl aluminium compounds, such as triethyl aluminium, alkyl aluminium hydrides, such as diisobutyl aluminium hydride, alkyl alkoxy aluminium compounds, and halogen-containing aluminium compounds, such as diethyl aluminium chloride, diisobutyl aluminium chloride, monoethyl aluminium dichloride and ethyl aluminium sesquichloride. Mixtures of such compounds may also be used.

As compounds of metals from the sub-groups IV to VI of the periodic system, compounds of titanium and vanadium are suitable in particular, but compounds of other metals, such as chromium, molybdenum, tungsten and zirconium may also be used. Examples of suitable compounds are the halides, oxyhalides, the alkoxides and the acetyl acetonates, such as titanium tetrachloride, titanium tetrabromide, tetrabutoxy titanium, vanadium tetrachloride, vanadium oxytrichloride, vanadium acetyl acetonate, chromium trichloride, molybdenum pentachloride, tungsten hexachloride and zirconium tetrachloride. Preference is given to vanadium compounds which are soluble in the polymerization medium.

The molar ratio of the organometallic compound to the compound from groups IV–VI may be varied between wide limits. Generally, this ratio will lie between 1:1 and 1500:1. Preferably, it is chosen between 2:1 and 300:1, more in particular between 3:1 and 50:1.

The activating halogen-containing compounds are applied in such a quantity that the molar ratio relative to the metal from groups IV—VI is between 0.1:1 and 300:1, by preference it is chosen between 1:1 and 50:1, more in particular between 2:1 and 30:1. Besides the three components mentioned, other substances may be added to the catalyst if this is advantageous. Such additional substances could be Lewis bases, which may also be used as catalyst component. Addition of such compounds is by no means required though to achieve a high polymer yield per weight unit of catalyst.

Suitable 1-alkenes which may be applied as monomer beside ethylene are the 1-alkenes with at most 12 carbon atoms, for instance propylene, butene-1, pentene-1, hexene-1, octene-1, the branched isomers thereof, for instance 4-methyl pentene-1, styrene, alpha-methyl styrene or mixtures of the alkenes described in the foregoing. In particular propylene and/or butene-1 is suitable.

The polyunsaturated compounds which may be used and which serve to bring about non-saturation in the polymer are those which are known for this purpose; they contain at least two C=C bonds and may be either aliphatic or alicyclic. The aliphatic polyunsaturated compounds generally contain 3 to 20 carbon atoms, the double bonds being either conjugated or, preferably, non-conjugated. Examples are: 1-3-butadiene, isoprene, 2,3-dimethyl butadiene 1-3,2-ethyl butadiene 1-3, piperylene, myrcene, allene, 1,2-butadiene, 1,4,9-decatrienes, 1,4-hexadiene, 1,5-hexadiene and 4-methyl hexadiene 1-4.

The alicyclic polyunsaturated compounds, in which a bridge group may be present or absent, may be both mono- and polycyclic. Examples of such compounds are norbornadiene and its alkyl derivatives; the alkylidene norbornenes, in particular the 5-alkylidene norbornenes-2, in which the alkylidene group contains 1 to 20, preferably 1 to 8 carbon atoms; the alkenyl norbornenes, in particular the 5-alkenyl norbornenes-2, in which the alkenyl group contains 2 to 20, preferably 2 to 10 carbon atoms, for instance vinyl norbornene, 5-(2'-methyl-2'butenyl)-norbornene-2 and 5-(3'-methyl-2'-butenyl)-norbornene-2; dichlopentadiene and the polyunsaturated compounds of bicyclo-(2,2,1)-heptane, bicyclo-(2,2,2)-octane, bicyclo-(3,2,1)-octane and bicyclo-(3,2,2)-nonane, at least one of the rings being unsaturated. Further, such compounds as 4,7,8,9-tetrahydroindene and isopropylidene tetrahydroindene may be used. In particular diclopentadiene, 5-methylene or 5-ethylidene norbornene-2, or hexadiene 1-4 are used. Mixtures of the compounds described in the foregoing may also be used.

The polyunsaturated compounds may be present in the polymer in quantities of up to 20% by wt., preferably up to 10% by wt., however.

Besides or instead of the polyunsaturated compound, an unsaturated compound with one or more functional groups, such as, for instance, halogen atoms, OH—, OR—, COOH—, COOR— or NH$_2$-groups, may be incorporated in the polymer, if desired, in a quantity of up to 20% by wt. Such functional monomers generally have an adverse effect on the activity of the polymerization catalyst. When applying the activators according to the invention, a reasonable polymerization rate can still be reached when functional monomers are present in the polymerization mixture.

The molar ratio of the monomers applied depends on the desired polymer compositions. Since the polymerization rate of the monomers varies widely, generally valid ranges of molar ratios cannot be given. In the copolymerization of ethylene and propylene, however, generally a molar ratio between 1:1 and 1:5 will be chosen. If a polyunsaturated compound is included in the polymerization, the molar ratio relative to ethylene will in most cases be 0.001:1 to 1:1.

The polymerization reaction is usually carried out at a temperature between 31'° and 100° C., preferably between 10° and 80° C. The pressure will usually be 1–50 ats., but higher or lower pressures are also possible. Preferably, the process is carried out continuously, but it may also be carried out semi-continuously or batchwise.

The residence time in the polymerization reaction may vary from a few seconds to a few hours. In general a residence time of between a few minutes and one hour will be chosen.

The polymerization takes place in a liquid which is inert relative to the catalyst, for instance one or more saturated aliphatic hydrocarbons, such as butane, pentane, hexane, heptane, pentamethyl heptane or petroleum fractions; aromatic hydrocarbons, for instance benzene or toluene, or halogenated aliphatic or aromatic hydrocarbons, for instance tetrachloroethylene. The temperature and the pressure may be chosen so that one or more of the monomers used, in particular the 1-alkene, for instance propylene, is liquid and is present in such a large quantity that it functions as distributor. Another distributor is not required then. The process according to the invention may be carried out in a polymerization reactor filled either with gas and liquid or with liquid only.

The molecular weight of the polymers can be influenced in general by the application of so-called chain regulators, for instance acetylene, zinc alkyls and alkyl halides and preferably by hydrogen. Even very small quantities of hydrogen influence the molecular weight to a sufficient degree and are still soluble in the polymerization medium.

From the reaction mixture obtained in the polymerization the polymer can, optionally after deactivation of the catalyst with water, with alcohol or with an acid, be separated out in the usual way by distillation, optionally whilst adding water, steam or methanol.

The copolymers obtained by the process according to the invention contain between 25 and 85% by wt. of ethylene. Preference is given, however, to products with an ethylene content of between 40 and 75% by wt. The process according to the invention can be used to particular advantage for the preparation of copolymers of an elastomeric nature. Such copolymers are suitable for a wide variety of applications, for instance for the manufacture of hose, conveyor belts, sealing profiles. If desired, they may be vulcanized by the usual methods with application of substances which yield free radicals such as peroxides, or with sulphur.

The invention will be elucidated by the following examples without being restricted thereto.

The activators which were used in these examples were chosen from the following group:
1. ethyl chlorophenyl acetate
2. ethyl dichlorophenyl acetate
3. butyl chlorophenyl acetate
4. butyl dichlorophenyl acetate
5. methyl dichlorophenyl acetate
6. methoxyethyl dichlorophenyl acetate
7. ethyl 2,2-dichloro-3-oxo-3-phenyl propionate
8. 2,2-dichloro-1,2-diphenyl ethanal
9. ethyl chloro(2,4-dichlorophenyl) acetate
10. ethyl chlorodiphenyl acetate
11. dichlorophenyl acetonitrile
12. ethyl chloro(2-thienyl) acetate
13. phenyl (4-carboethoxyphenyl) dichloromethane.

The formulas of these compounds are represented as follows:

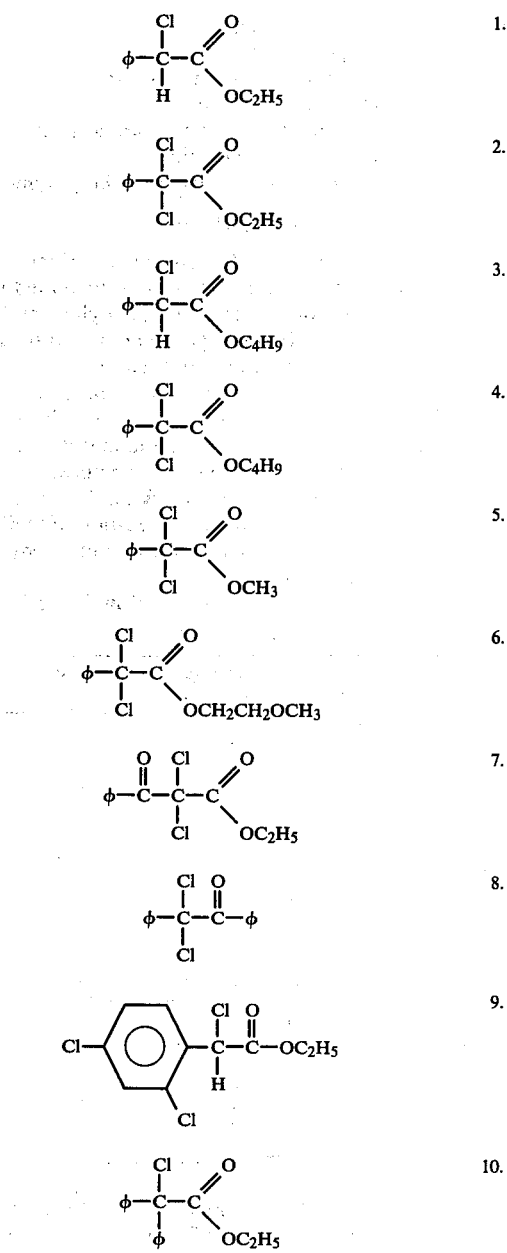

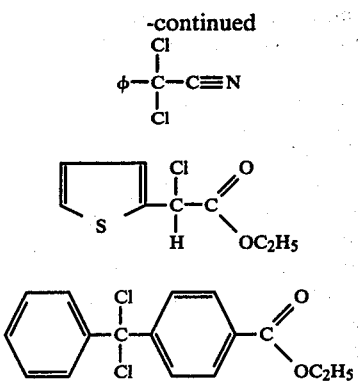

-continued

11. φ—C(Cl)(Cl)—C≡N 12. (thiophene)-C(Cl)(H)—C(=O)OC₂H₅

13. (C₆H₅)—C(Cl)(Cl)—(C₆H₄)—C(=O)OC₂H₅

The activators are denoted in the tables by the numbers enumerated above.

The abbreviations used in the examples and the tables stand for the following:
EN = ethylidene norbornene
DCPD = dichlopentadiene
SEAC = ethyl aluminium sesquichloride
TCAE = ethyl trichloroacetate
PCCE = butyl ester of perchlorocrotonic acid
sol. conc. = solution concentration
$C_3$-cont. = propylene units content of the polymer.

EXAMPLE 1

Preparation of ethylene/propylene copolymers. Into a 1-liter double-walled reactor of glass, provided with a stirrer, feed tubes for ethylene and propylene and a gas discharge tube, 0.5 liter of gasoline was introduced. Subsequently, ethylene and propylene were fed to the reactor at rates of 35 l/h and 70 l/h respectively. After saturation of the gasoline with monomer, the catalyst components were added in the amounts stated in Table 1. During the polymerization the temperature in the reactor was maintained at 50° C. After 15 minutes the polymerization was terminated by addition of methanol. The polymer was recovered from the solution by evaporation of the gasoline.

The data and the results are stated in Table 1.

TABLE 1

| experiment no. | SEAC mmol/l | VOCl₃ mmol/l | activator type | activator mmol/l | mol. rat act./V | yield grammes |
|---|---|---|---|---|---|---|
| 1 | 4 | 0.4 | — | — | | 3.2 |
| 2 | 8 | 0.4 | 1 | 2 | 5 | 5.1 |
| 3 | 8 | 0.4 | 1 | 4 | 10 | 6.6 |
| 4 | 12 | 0.4 | 1 | 6 | 15 | 7.3 |
| 5 | 16 | 0.4 | 1 | 8 | 20 | 8.7 |
| 6 | 36 | 0.4 | 1 | 12 | 30 | 10.2 |
| 7 | 4 | 0.4 | 2 | 2 | 5 | 6.3 |
| 8 | 8 | 0.4 | 2 | 4 | 10 | 6.9 |
| 9 | 12 | 0.4 | 2 | 6 | 15 | 7.3 |
| 10 | 16 | 0.4 | 2 | 8 | 20 | 8.5 |
| 11 | 24 | 0.4 | 2 | 12 | 30 | 9.4 |
| 12 | 4 | 0.4 | 3 | 2 | 5 | 5.8 |
| 13 | 8 | 0.4 | 3 | 4 | 10 | 6.8 |
| 14 | 12 | 0.4 | 3 | 6 | 15 | 7.4 |
| 15 | 16 | 0.4 | 3 | 8 | 20 | 8.5 |
| 16 | 60 | 0.4 | 3 | 12 | 30 | 11.0 |
| 17 | 6 | 0.4 | 4 | 2 | 5 | 5.8 |
| 18 | 8 | 0.4 | 4 | 4 | 10 | 7.2 |
| 19 | 18 | 0.4 | 4 | 6 | 15 | 7.9 |
| 20 | 16 | 0.4 | 4 | 8 | 20 | 9.4 |
| 21 | 36 | 0.4 | 4 | 12 | 30 | 10.4 |

These results show that an increase of the ratio of the halogen-containing compound relative to vanadium leads to a higher copolymer yield. Furthermore it appears that various ratios of the aluminium compound relative to the halogen-containing compound may be used to obtain a good polymer yield.

EXAMPLE 2

Continuous preparation of copolymers of ethylene and propylene.

The polymerization was effected in a steel 2.5-liter reactor provided with a stirrer, a cooling jacket and the required feed and discharge lines. Gasoline was supplied to the reactor at a rate of 3 l/h. Ethylene, propylene and hydrogen were introduced into the reactor in the form of gas in the amounts stated in the table. Gasoline solutions of ethyl aluminium sesquichloride, vanadium oxytrichloride and activator, the butyl ester of phenyl dichloroacetic acid, were all supplied to the reactor at a rate of 0.6 l/h. The concentrations of these solutions were such that the concentrations of the catalyst components in the reactor were maintained at the values stated in the table. The volume in the reactor was maintained at 0.6 l by continuously draining the polymer solution, while the temperature in the reactor was kept at 50° C. and the pressure at 6.5 ats. The solution drained from the reactor was deactivated by addition of methanol, and the polymer concentration was determined. The concentration of the solution is a measure of the activity of the catalyst system. The data and the results are stated in Table 2.

TABLE 2

| Experiment no. | activator mmol/l | SEAC mmol/l | VOCl₃ mmol/l | H₂ l/h | C₂H₄ l/h | C₃H₆ l/h | sol. conc. g/l | C₃-cont. % by wt. |
|---|---|---|---|---|---|---|---|---|
| 1 | 0.2 | 0.6 | 0.1 | 13 | 299 | 446 | 52.0 | 34.5 |
| 2 | 0.2 | 0.6 | 0.05 | 13 | 255 | 446 | 48.0 | 34.7 |
| 3 | 0.2 | 0.6 | 0.02 | 13 | 255 | 446 | 46.6 | 34.4 |
| 4 | 0.2 | 0.6 | 0.01 | 13 | 299 | 446 | 51.6 | 34.9 |
| 5 | 0.2 | 0.6 | 0.005 | 13 | 299 | 396 | 51.2 | 34.4 |
| 6 | 0.2 | 0.6 | 0.0025 | 18 | 255 | 446 | 33.2 | 34.3 |

This table shows that also with low vanadium concentrations a high copolymer yield can be obtained.

EXAMPLE 3

Preparation of terpolymers of ethylene, propylene and a polyunsaturated compound.

The polymerization was carried out in a 2.5-liter steel reactor provided with a stirrer, a cooling jacket and the necessary feed and discharge lines. Gasoline was supplied to the reactor at a rate of 3 l/h. Gaseous ethylene and propylene were supplied to the reactor in the quantities stated in the table. Gasoline solutions of ethyl aluminium sesquichloride and vanadium oxytrichloride were supplied to the reactor at a rate of 0.6 l/h. The termonomer, ethylidene norbornene, and the activator were dissolved together in gasoline and the resultant solution was also supplied to the reactor at a rate of 0.6 l/h. The concentrations of the various solutions were chosen so that the termonomer and catalyst component concentrations as stated in the table were applied. The volume in the reactor was kept constant at 0.6 l by continuously draining the polymer solution, while the temperature in the reactor was kept at 50° C. and the pressure at 6.5 ats. The reaction mixture drained from the reactor was deactivated by addition of methanol, and the polymer concentrations was determined. The polymer concentration of the solution is a measure of the activity of the catalyst system. The data and the results are stated in Table 3.

TABLE 3

| Experiment no. | activator type | activator mmol/l | SEAC mmol/l | VOCl$_3$ mmol/l | EN mmol/l | C$_2$H$_4$ l/h | C$_3$H$_6$ l/h | sol. conc. g/l | C$_3$ cont. % by wt. | EN cont. % by wt. |
|---|---|---|---|---|---|---|---|---|---|---|
| 1* | — | — | 1.0 | 0.05 | 15 | 129 | 446 | 3.8 | 38.3 | 4.6 |
| 2 | 5 | 0.20 | 1.0 | 0.05 | 15 | 129 | 446 | 26.6 | 43.1 | 3.0 |
| 3 | 2 | 0.20 | 1.0 | 0.05 | 15 | 129 | 446 | 25.2 | 43.5 | 3.2 |
| 4 | 4 | 0.20 | 1.0 | 0.05 | 15 | 129 | 446 | 25.0 | 42.9 | 3.0 |
| 5 | 6 | 0.20 | 1.0 | 0.05 | 15 | 132 | 436 | 26.6 | 42.9 | 3.0 |
| 6 | 7 | 0.20 | 1.0 | 0.05 | 15 | 135 | 470 | 14.0 | 40.1 | 4.3 |
| 7 | 8 | 0.22 | 1.0 | 0.05 | 15 | 129 | 446 | 16.0 | 42.6 | 4.5 |
| 8* | — | — | 2.0 | 0.10 | 15 | 129 | 446 | 7.8 | 34.8 | 4.3 |
| 9 | 1 | 0.40 | 2.0 | 0.10 | 15 | 132 | 436 | 28.4 | 43.6 | 3.0 |
| 10 | 9 | 0.40 | 2.0 | 0.10 | 15 | 135 | 470 | 23.7 | 45.5 | 3.2 |
| 11 | 10 | 0.40 | 2.0 | 0.10 | 12.4 | 151 | 457 | 33.0 | 44.0 | 3.7 |
| 12 | 12 | 0.40 | 2.0 | 0.10 | 15 | 129 | 446 | 30.0 | 43.2 | 2.8 |
| 13 | 11 | 0.10 | 2.0 | 0.10 | 15 | 129 | 446 | 16.6 | 39.5 | 4.5 |
| 14 | 13 | 0.20 | 1.0 | 0.05 | 15 | 129 | 446 | 23.2 | 39.8 | 3.4 |
| 15* | PCCE | 0.20 | 1.0 | 0.05 | 15 | 132 | 436 | 28.6 | 43.2 | 2.9 |

*These tests are not in accordance with the invention.

Application of corresponding bromium compounds gave analogous results.

EXAMPLE 4

In a similar manner as described in example 3, terpolymers of ethylene, propylene and ethylidine norbornene were prepared at 50° C. and 6.5 ats. The data and results are stated in Table 4.

It can be observed that with application of activators according to the invention, also with low vanadium concentrations in the reactor reasonable polymer yields can still be obtained.

EXAMPLE 5

In a similar manner as described in example 3, terpolymers of ethylene, propylene and ethylidene norbornene (EN) or dicyclopentadiene (DCPD) were prepared at 50° C. and 6.5 ats. After deactivation of the catalyst with methanol the polymer solution was washed first with diluted hydrochloric acid, next with water, after which the polymer was recovered by evaporation of the solvent. The halogen content of the polymer thus obtained was determined. The data and the results are stated in Table 5.

It clearly appears that with activators according to the invention products with a low halogen content can

TABLE 4

| Experiment no. | activator type | activator mmol/l | SEAC mmol/l | VOCl$_3$ mmol/l | EN mmol/l | C$_2$H$_4$ l/h | C$_3$H$_6$ l/h | H$_2$ l/h | sol. conc. g/l | C$_3$ cont. % by wt. | EN cont. % by wt. |
|---|---|---|---|---|---|---|---|---|---|---|---|
| 1 | 4 | 0.2 | 0.6 | 0.1 | 15 | 242 | 477 | 15 | 35.0 | 36.5 | 2.5 |
| 2 | 4 | 0.2 | 0.6 | 0.05 | 15 | 242 | 477 | 15 | 37.4 | 37.9 | 2.6 |
| 3 | 4 | 0.2 | 0.6 | 0.02 | 15 | 242 | 477 | 15 | 36.2 | 37.1 | 3.0 |
| 4 | 4 | 0.2 | 0.6 | 0.01 | 15 | 242 | 477 | 15 | 31.8 | 36.9 | 3.0 |
| 5 | 4 | 0.2 | 0.6 | 0.005 | 15 | 143 | 477 | — | 15.4 | 40.1 | 4.8 |
| 6 | 4 | 0.2 | 0.6 | 0.005 | 15 | 242 | 477 | 15 | 27.4 | 35.4 | 3.7 |
| 7 | 4 | 0.2 | 1.0 | 0.002 | 15 | 151 | 457 | — | 11.2 | 37.4 | 4.7 |
| 8 | 4 | 0.2 | 1.0 | 0.001 | 15 | 151 | 457 | — | 6.4 | 34.7 | 5.2 |
| 9 | 10 | 0.2 | 0.6 | 0.1 | 15 | 242 | 477 | 15 | 31.8 | 33.4 | 3.1 |
| 10 | 10 | 0.2 | 0.6 | 0.05 | 15 | 242 | 477 | — | 33.6 | 37.0 | 2.8 |
| 11 | 10 | 0.2 | 0.6 | 0.02 | 15 | 242 | 477 | 15 | 34.6 | 36.5 | 2.7 |
| 12 | 10 | 0.2 | 0.6 | 0.01 | 15 | 242 | 477 | 15 | 30.2 | 35.5 | 3.0 |
| 13 | 10 | 0.2 | 0.6 | 0.005 | 15 | 242 | 477 | 15 | 23.6 | 35.1 | 3.0 |
| 14 | 10 | 0.2 | 0.6 | 0.0025 | 15 | 242 | 477 | 15 | 13.4 | 31.1 | 3.8 | be obtained.

TABLE 5

| Experiment no. | SEAC mmol/l | VOCL$_3$ mmol/l | activator type | activator mmol/l | EN mmol/l | DCPD mmol/l | C$_2$H$_4$ l/h | C$_3$H$_6$ l/h | H$_2$ l/h | sol. cont. g/h | C$_3$ cont. % by wt. | EN cont. % by wt. | DCPD cont. % by wt. | Cl cont. ppm |
|---|---|---|---|---|---|---|---|---|---|---|---|---|---|---|
| 1* | 2.0 | 0.1 | TCAE | 0.4 | 15 | | 151 | 457 | — | 17.8 | 42.6 | 3.9 | | 500 |
| 2 | 2.0 | 0.1 | 1 | 0.4 | 15 | | 132 | 436 | — | 28.4 | 43.6 | 3.0 | | 170 |
| 3 | 2.0 | 0.1 | 1 | 0.4 | | 15 | 132 | 436 | — | 27.8 | 42.4 | | 3.3 | 130 |
| 4 | 2.0 | 0.1 | 12 | 0.4 | 15 | | 129 | 446 | — | 30.0 | 43.2 | 2.8 | | 195 |
| 5 | 1.0 | 0.05 | 2 | 0.2 | 15 | | 132 | 436 | — | 25.8 | 42.9 | 3.3 | | 150 |
| 6 | 1.0 | 0.05 | 2 | 0.2 | | 15 | 132 | 436 | — | 26.4 | 42.1 | | 3.9 | 115 |
| 7 | 1.0 | 0.05 | 6 | 0.2 | 15 | | 132 | 436 | — | 26.6 | 42.9 | 3.0 | | 183 |
| 8* | 1.0 | 0.05 | PCCE | 0.2 | 15 | | 132 | 436 | — | 28.6 | 43.2 | 2.9 | | 690 |
| 9* | 1.0 | 0.05 | PCCE | 0.2 | | 15 | 132 | 436 | — | 20.8 | 41.8 | | 3.4 | 715 |
| 10 | 0.6 | 0.02 | 4 | 0.2 | 15 | | 242 | 477 | 15 | 36.2 | 37.1 | 3.0 | | 164 |
| 11 | 0.6 | 0.02 | 10 | 0.2 | 15 | | 242 | 477 | 15 | 34.6 | 36.5 | 2.7 | | 70 |
| 12 | 0.6 | 0.01 | 10 | 0.2 | 15 | | 242 | 477 | 15 | 30.2 | 35.5 | 3.0 | | 90 |
| 13 | 0.6 | 0.005 | 10 | 0.2 | 15 | | 242 | 477 | 15 | 23.6 | 35.1 | 3.0 | | 75 |

TABLE 5-continued

| Experiment no. | SEAC mmol/l | VOCL$_3$ mmol/l | activator type | activator mmol/l | EN mmol/l | DCPD mmol/l | C$_2$H$_4$ l/h | C$_3$H$_6$ l/h | H$_2$ l/h | sol. cont. g/h | C$_3$ cont. % by wt. | EN cont. % by wt. | DCPD cont. % by wt. | Cl cont. ppm |
|---|---|---|---|---|---|---|---|---|---|---|---|---|---|---|
| 14 | 0.6 | 0.0025 | 10 | 0.2 | 15 | | 242 | 477 | 15 | 13.4 | 31.1 | 3.8 | | 95 |

*These tests are not in accordance with the invention.
TCAE: trichloroacetic acid ester
PCCE: perchlorocrotonic acid ester

I claim:
1. A process for copolymerization to form copolymers containing
from 25-85 Wt. % of ethylene units,
from 15-75 Wt. % of units of at least one other 1-alkene,
and up to 20% of units of aliphatic or alicyclic polyunsaturated monomer of from 3 to 20 carbon atoms and having at least two non-conjugated carbon-carbon double bonds wherein the catalyst system employed contains
(a) a compound of vanadium which is soluble in the polymerization medium,
(b) a compound of metal from Periodic Table Groups I-III in which at least one hydrocarbon group is bound directly to the metal atom through a carbon atom
in the presence of a halogen compound of the general formula:

wherein
A represents a phenyl group having at most one substituent halogen atom or up to two alkyl groups, or a thienyl, furyl, pyrollyl, N-alkylpyrollyl, or pyridyl group bonded to the carbon atom directly or through a carbonyl group
X is chlorine or bromine
Y is chlorine, bromine, hydrogen, or a hydrocarbon group of from 1 to 8 carbon atoms, and
Z represents one of the radicals represented by the following formulae:

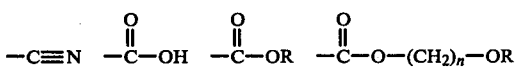

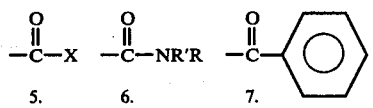

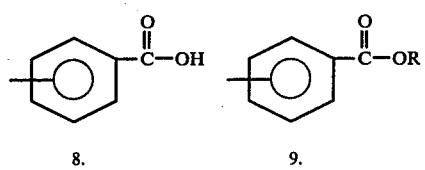

wherein R and R$^1$ represent hydrocarbon groups of from 1 to 8 carbon atoms, and wherein A, X, Y, and Z are chosen such that said halogen compound contains a total of at most two halogen atoms.

2. Process according to claim 1 characterized in that the halogen-containing compound is an alkyl or alkoxy alkyl ester of phenyl mono-or dichloroacetic acid.

3. Process according to claim 1 characterized in that the halogen-containing compound is an alkyl or alkoxy alkyl ester of diphenyl monochloroacetic acid.

4. Process according to any one of claims 1, 2, or 3 characterized in that the catalyst system contains a vanadium compound which is soluble in the polymerization medium and an alkyl aluminum halide.

5. Process according to any one of claims 1, 2, or 3 characterized in that the catalyst system contains vanadium oxytrichloride and ethyl aluminum sesquihalide.

6. Process according to any one of claims 1, 2, or 3 characterized in that the halogen-containing compound is used in such a quantity that the molar ration relative to the vanadium is between 0.1:1 and 300:1.

7. Process according to any one of claims 1, 2, or 3 characterized in that the halogen-containing compound is used in such a quantity that the molar ratio relative to the vanadium is between 1:1 and 50:1.

8. A process for copolymerization to form copolymers containing
from 25-85 Wt. % of ethylene units,
from 15-75 Wt. % of units of at least one other 1-alkene,
and up to 20% of units of aliphatic or alicyclic polyunsaturated monomer of from 3 to 20 carbon atoms and having at least two carbon-carbon double bands
wherein the catalyst system employed contains
(a) a compound of metal from Periodic Table Groups IVb-VIb,
(b) a compound of metal from Periodic Table Groups I-III in which at least one hydrocarbon group is bound directly to the metal atom through a carbon atom
in the presence of an alkyl or alkyl alkoxy ester of benzoyl mono- or di-chloroacetic acid.

9. A process for copolymerization to form copolymers containing
from 25-85 Wt. % of ethylene units,
from 15-75 Wt. % of units of at least one other 1-alkene,
and up to 20% of units of aliphatic or alicyclic polyunsaturated monomer of from 3 to 20 carbon atoms and having at least two carbon-carbon double bands
wherein the catalyst system employed contains
(a) a compound of metal from Periodic Table Groups IVb-VIb,
(b) a compound of metal from Periodic Table Groups I-III in which at least one hydrocarbon group is bound directly to the metal atom through a carbon atom
in the presence of an alkyl or alkyl alkoxy ester of thienyl mono- or di-chloroacetic acid.

10. Process according to any one of the claims 8 or 9, characterized in that the catalyst system contains a vanadium compound which is soluble in the polymerization medium and an alkyl aluminium halide.

11. Process according to any one of claims 8 or 9, characterized in that the catalyst system contains vanadium oxytrichloride and ethyl aluminium sesquihalide.

12. Process according to any one of the claims 8 or 9, characterized in that the halogen-containing compound is used in such a quantity that the molar ratio relative to the metal from groups IV–VI is between 0.1:1 and 300:1.

13. Process according to any one of claim 8 or 9, characterized in that the halogen-containing compound is used in such a quantity that the molar ratio relative to the metal from groups IV—VI is between 1:1 and 50:1.

14. A process for copolymerization to form copolymers containing
from 25–85 Wt. % of ethylene units,
from 15–75 Wt. % of units of at least one other 1-alkene,
and up to 20% of units of aliphatic or alicyclic polyunsaturated monomer of from 3 to 20 carbon atoms and having at least two non-conjugated carbon-carbon double bonds
wherein the catalyst system employed contains
(a) vanadium oxytrichloride
(b) ethyl aluminum sesquihalide
in the presence of a halogen compound of the general formula:

wherein

A represents a phenyl group having at most one substituent halogen atom or up to two alkyl groups, or a thienyl, furyl, pyrollyl, N-alkylpyrollyl, or pyridyl group bonded to the carbon atom directly or through a carbonyl group X is chlorine or bromine Y is chlorine, bromine, hydrogen, or a hydrocarbon group of from 1 to 8 carbon atoms, and Z represents one of the radicals represented by the following formulae:

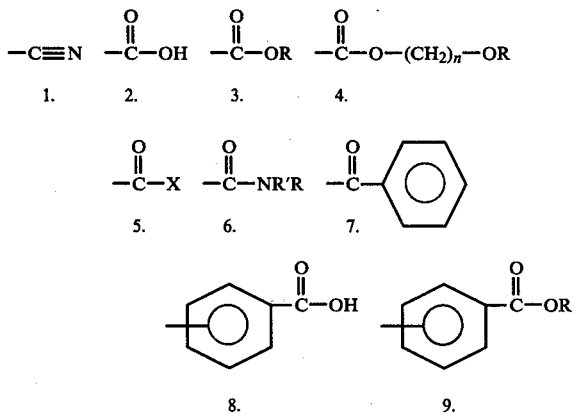

wherein R and R' represent hydrocarbon groups of from 1 to 8 carbon atoms, wherein A, X, Y, and Z are chosen such that said halogen compound contains a total of at most two halogen atoms and wherein said halogen-containing compound is present in a molar ratio relative to said vanadium compound of between 0.1:1 and 300:1.

15. The process of claim 14 wherein said molar ratio is between 1:1 and 50:1.

* * * * *

UNITED STATES PATENT AND TRADEMARK OFFICE
CERTIFICATE OF CORRECTION

PATENT NO. : 4,435,552
DATED : March 6, 1984
INVENTOR(S) : GEORGES E. EVENS

It is certified that error appears in the above-identified patent and that said Letters Patent is hereby corrected as shown below:

Column 4, lines 51 and 58, and column 7, line 22, in each instance, "dichlopentadiene" should read --dicyclopentadiene--.

Column 5, line 17, " 31'° " should read -- -40° --.

Column 9, line 28, "ethylidine" should read --ethylidene--.

Signed and Sealed this

Sixth Day of November 1984

[SEAL]

Attest:

GERALD J. MOSSINGHOFF

Attesting Officer

Commissioner of Patents and Trademarks